(12) United States Patent
Hua et al.

(10) Patent No.: US 11,836,371 B1
(45) Date of Patent: Dec. 5, 2023

(54) HIGH PERFORMANCE DATA MIRRORING IN A MULTI-CONTROLLER MEMORY SUBSYSTEM

(71) Applicant: Dell Products L.P., Hopkinton, MA (US)

(72) Inventors: Kuolin Hua, Natick, MA (US); Adnan Sahin, Needham, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/860,647

(22) Filed: Jul. 8, 2022

(51) Int. Cl.
*G06F 3/06* (2006.01)
(52) U.S. Cl.
CPC .......... *G06F 3/0644* (2013.01); *G06F 3/0607* (2013.01); *G06F 3/0658* (2013.01); *G06F 3/0679* (2013.01)
(58) Field of Classification Search
CPC .... G06F 3/0644; G06F 3/0607; G06F 3/0658; G06F 3/0679; G06F 17/10; G06F 17/16; G06F 9/5066; G06F 9/5072; G06F 9/5061; G06F 9/5077; G06F 9/30; G06F 12/0207; G06F 12/02
See application file for complete search history.

(56) References Cited

U.S. PATENT DOCUMENTS

2006/0265445 A1* 11/2006 Gustavson ............. G06F 17/16
708/520
2018/0032477 A1* 2/2018 Gholaminejad .......... G06F 7/78

OTHER PUBLICATIONS

B. Charny, "Matrix partitioning on a virtual shared memory parallel machine," in IEEE Transactions on Parallel and Distributed Systems, vol. 7, No. 4, pp. 343-355, Apr. 1996, doi: 10.1109/71.494629. (Year: 1996).*

* cited by examiner

*Primary Examiner* — Khoa D Doan
(74) *Attorney, Agent, or Firm* — Anderson Gorecki LLP

(57) ABSTRACT

A storage system memory or memory domain with N memory controllers is organized into N-1 same-size partitions per memory controller or N partitions per memory controller with one partition reserved as spare capacity. The unreserved partitions are assigned to mirror pairs of members such that a first triangular submatrix of a representative matrix of indexed memory controllers and indexed partitions is a transpose of a second triangular submatrix of the representative matrix. The resulting distribution of members is balanced such that additional loading on remaining memory controllers when one of the memory controllers becomes inaccessible is evenly distributed.

20 Claims, 10 Drawing Sheets

| C/P | 1 | 2 | 3 | 4 | 5 |
|---|---|---|---|---|---|
| 1 | A | B | C | D | E |
| 2 | A | B | C | D | E |
| 3 | F | G | H | I | J |
| 4 | F | G | H | I | J |
| 5 | K | L | M | N | O |
| 6 | K | L | M | N | O |

Figure 3A

| C/P | 1 | 2 | 3 | 4 | 5 |
|---|---|---|---|---|---|
| 1 | A | B | C | D | E |
| 2 | A | B | C | D | E |
| 3 | F | G | H | I | J |
| 4 | F | G | H | I | J |
| 5 | K | L | M | N | O |
| 6 | K | L | M | N | O |

Figure 3B

| C/P | 1 | 2 | 3 | 4 | 5 | 6 |
|---|---|---|---|---|---|---|
| 1 | A | B | C | D | E | |
| 2 | A | B | C | D | E | |
| 3 | F | G | H | I | J | |
| 4 | F | G | H | I | J | |
| 5 | K | L | M | N | | |
| 6 | K | L | M | N | | |

Figure 4A

| C/P | 1 | 2 | 3 | 4 | 5 | 6 |
|---|---|---|---|---|---|---|
| 1 | A | B | C | D | E | |
| 2 | A | B | C | D | E | |
| 3 | F | G | H | I | J | A |
| 4 | F | G | H | I | J | B |
| 5 | K | L | M | N | | C |
| 6 | K | L | M | N | E | D |

Figure 4B

| C/P | 1 | 2 | 3 | 4 | 5 |
|---|---|---|---|---|---|
| 1 | A | B | C | D | E |
| 2 | A | F | G | H | I |
| 3 | B | F | J | K | L |
| 4 | C | G | J | M | N |
| 5 | D | H | K | M | O |
| 6 | E | I | L | N | O |

Figure 5A

|   | 1 | 2 | 3 | 4 | 5 |
|---|---|---|---|---|---|
|   | A | B | C | D | E |
|   |   | F | G | H | I |
|   |   |   | J | K | L |
|   |   |   |   | M | N |
|   |   |   |   |   | O |
|   |   |   |   |   |   |

| C/P | 1 | 2 | 3 | 4 | 5 |
|---|---|---|---|---|---|
| 1 |   |   |   |   |   |
| 2 | A |   |   |   |   |
| 3 | B | F |   |   |   |
| 4 | C | G | J |   |   |
| 5 | D | H | K | M |   |
| 6 | E | I | L | N | O |

Figure 5B

| C/P | 1 | 2 | 3 | 4 | 5 |
|-----|---|---|---|---|---|
| 1 | A | B | C | D | E |
| 2 | A | F | G | H | I |
| 3 | B | F | J | K | L |
| 4 | C | G | J | M | N |
| 5 | D | H | K | M | O |
| 6 | E | I | L | N | O |

Figure 6

| C/P | 1 | 2 | 3 | 4 | 5 |
|-----|---|---|---|---|---|
| 1 | A | B | C | D | E |
| 2 | A | F | G | H | I |
| 3 | B | F | J | K | L |
| 4 | C | G | J | M | N |
| 5 | D | H | K | M | O |
| 6 | E | I | L | N | O |

Figure 7

| C/P | 1 | 2 | 3 | 4 | 5 | 6 |
|-----|---|---|---|---|---|---|
| 1 | A | B | C | D | E |   |
| 2 | A | F | G | H | I |   |
| 3 | B | F | J | K | L |   |
| 4 | C | G | J | M | N |   |
| 5 | D | H | K | M | O |   |
| 6 | E | I | L | N | O |   |

Figure 8A

| C/P | 1 | 2 | 3 | 4 | 5 | 6 |
|-----|---|---|---|---|---|---|
| 1 | A | B | C | D | E | L |
| 2 | A | F | G | H | I | B |
| 3 | B | F | J | K | L |   |
| 4 | C | G | J | M | N | F |
| 5 | D | H | K | M | O | J |
| 6 | E | I | L | N | O | K |

Figure 8B

HIGH PERFORMANCE DATA MIRRORING IN A MULTI-CONTROLLER MEMORY SUBSYSTEM

TECHNICAL FIELD

The subject matter of this disclosure is generally related to memory mirroring in data storage systems.

BACKGROUND

An enterprise data storage system typically includes multiple compute nodes and arrays of non-volatile data storage drives. Main memory may be integrated into the compute nodes or, in a disaggregated system, implemented as separate memory banks, e.g., mounted on different printed circuit boards. The main memory and drives are used to store user data and associated meta-data. The main memory in a software-defined storage area network (SAN) can be shared between compute nodes via remote direct memory access (RDMA). In a disaggregated system, the memory banks may be shared among compute nodes using an interconnect standard such as Compute Express Link (CXL) on Peripheral Component Interconnect Express (PCIe). Memory mirroring is implemented in both types of systems to improve performance and resiliency.

SUMMARY

All examples, aspects, and features mentioned in this document can be combined in any technically possible way.

In accordance with some aspects, an apparatus comprises a non-transitory storage system memory organized into a number of same-size partitions per memory controller, the partitions being assigned to members of mirror pairs such that a first triangular submatrix of a representative matrix of the memory controllers and the partitions is a transpose of a second triangular submatrix of the representative matrix.

In accordance with some aspects, a method comprises organizing a storage system memory into a number of same-size partitions per memory controller; and assigning the partitions to members of mirror pairs such that a first triangular submatrix of a representative matrix of the memory controllers and the partitions is a transpose of a second triangular submatrix of the representative matrix.

In accordance with some aspects, a non-transitory computer-readable storage medium stores instructions that when executed by a computer cause the computer to perform a method comprising organizing a storage system memory into a number of same-size partitions per memory controller; and assigning the partitions to members of mirror pairs such that a first triangular submatrix of a representative matrix of the memory controllers and the partitions is a transpose of a second triangular submatrix of the representative matrix.

BRIEF DESCRIPTION OF THE FIGURES

FIGS. 3A and 3B illustrate mirrored memory controllers.

FIGS. 4A and 4B illustrate use of spare capacity with mirrored memory controllers.

FIGS. 5A and 5B illustrate balanced distribution of mirrored pairs.

FIG. 6 illustrates parallelized access to members of the mirrored pairs when one of the memory controllers becomes inaccessible.

FIG. 7 illustrates balanced memory partition subsets with the mirror pairs of FIGS. 5A and 5B.

FIGS. 8A and 8B illustrate distribution and use of spare capacity with the mirror pairs of FIGS. 5A and 5B.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors. The terms "disk" and "drive" are used interchangeably and are not intended to be limited to a particular type of non-volatile data storage media.

Figure 1:
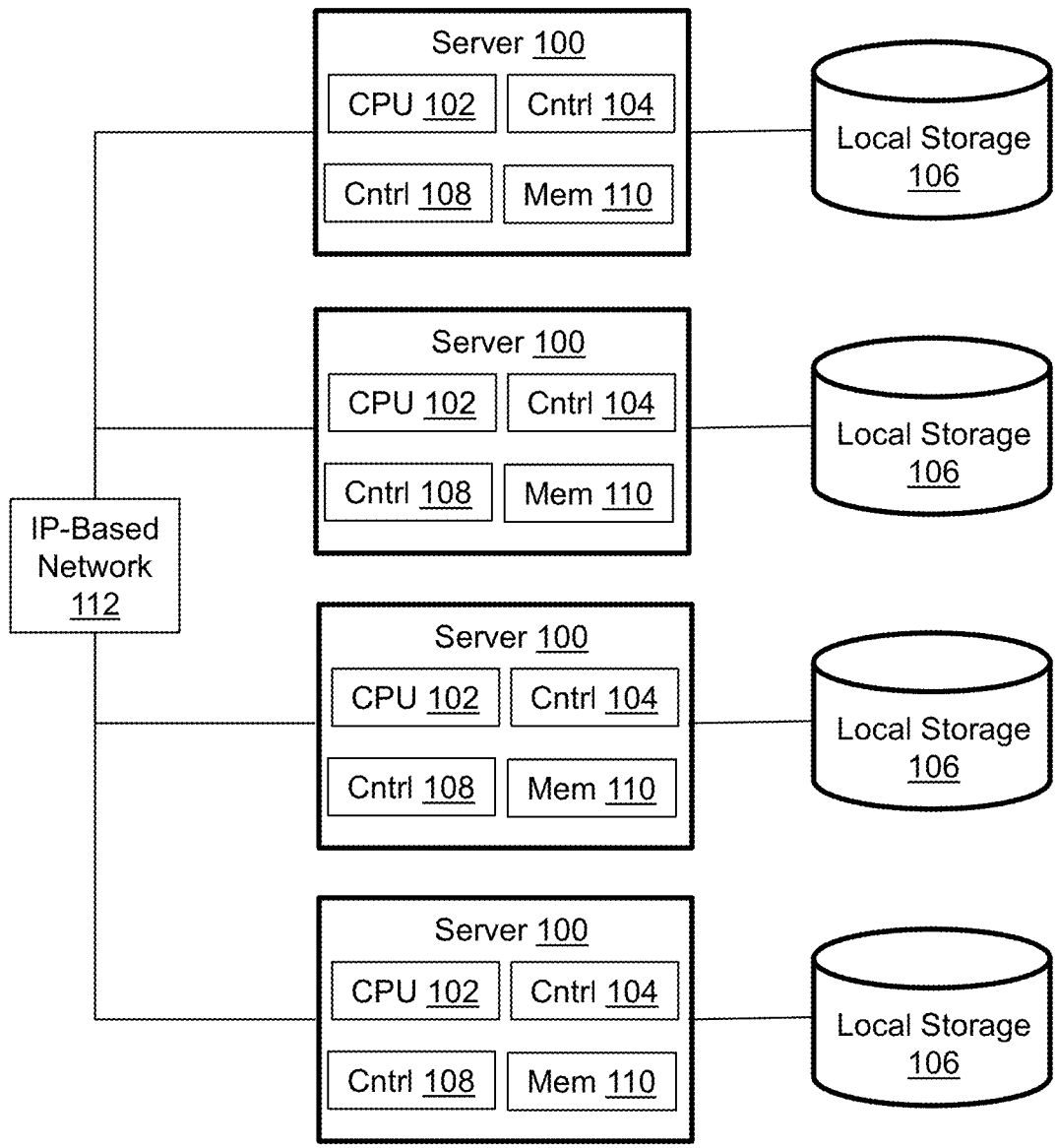
FIG. 1 illustrates a software-defined, server-based SAN in which the presently disclosed memory mirroring is implemented.

FIG. 1 illustrates a software-defined SAN in which the presently disclosed memory mirroring technique is implemented. The software-defined SAN includes multiple servers 100 that are interconnected via an Internet Protocol (IP) network 112. Each server 100 includes a multi-core CPU 102, a disk controller 104, a memory controller 108, and a memory bank 110. The CPU 102 includes L1 onboard cache. The memory bank 110 includes L2/L3 cache and main memory implemented with one or both of volatile memory components such as Double Data Rate Synchronous Dynamic Random Access Memory (DDR SDRAM), and non-volatile memory (NVM) such as storage class memory (SCM). Each server 100 manages access to non-volatile local storage 106 media that is directly connected to the server. The local storage may include, for example, and without limitation, solid-state drives (SSDs) based on electrically erasable programmable read-only memory (EEPROM) technology such as NAND and NOR flash memory and hard disk drives (HDDs) with spinning disk magnetic storage media. The local storage 106 is organized into redundant arrays of independent disks (RAID) to reduce data access latency and reduce the possibility of data loss in the event of drive failure. The memory banks 110 are organized into RAID-1-like mirrors as will be explained in greater detail below. The software-defined SAN architecture is advantageously scalable by adding individual servers with associated local storage.

Figure 2:
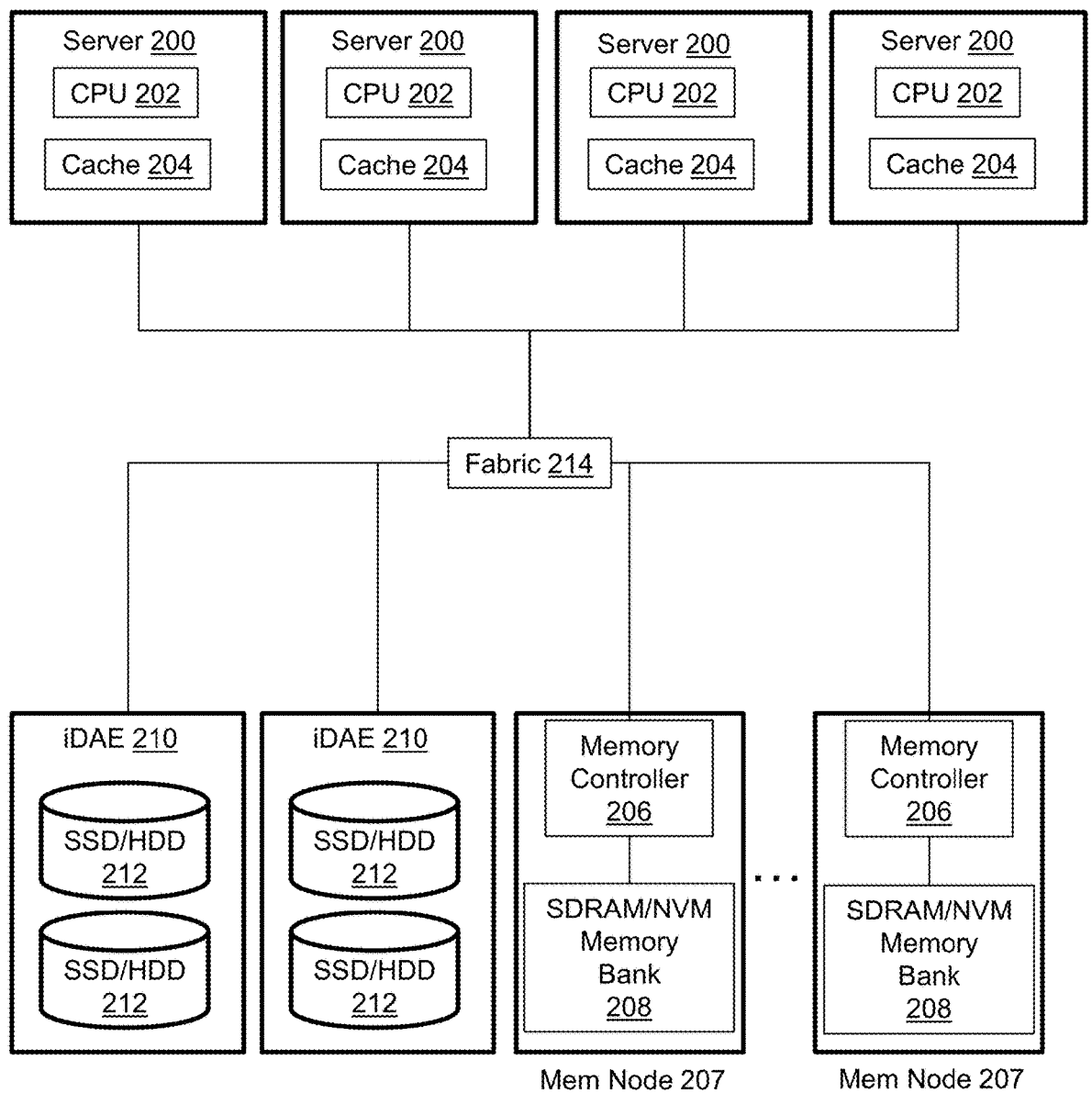
FIG. 2 illustrates a disaggregated storage system in which the presently disclosed memory mirroring is implemented.

FIG. 2 illustrates a disaggregated storage system in which the presently disclosed memory mirroring is implemented. The disaggregated storage system includes multiple servers 200 that are interconnected via a fabric 214 that supports an interconnect standard such as CXL on PCIe. Each server 200 includes a multi-core CPU 202 and L1/L2 cache 204. Non-volatile managed drives 212 such as SSDs and HDDs are deployed in intelligent disk array enclosures (iDAEs) 210 that support the interconnect standard and are accessible via the fabric 214. The disaggregated system includes multiple memory nodes 207, each including a memory controller 206 and an associated memory bank 208. The memory banks 208 may include DDR SDRAM, NVM, and any other of a variety of memory components in any combination or alone. All of the memory nodes 207 and iDAEs 210 are accessible by all servers 200 via the fabric 214. The managed drives 212 are organized into RAID groupings to reduce data access latency and reduce the possibility of data loss in the event of drive failure. The memory banks are organized into RAID-1-like mirrors as will be explained in greater detail below. The disaggregated architecture is advantageously scalable by adding one or more of servers, managed drives, and memory nodes in any combination to independently scale compute, storage, and memory capabilities. Moreover, resource utilization may be improved by interconnection and sharing of all compute, storage, and memory resources.

FIG. 3A illustrates RAID-1-like mirrored memory controllers. The global memory space of the storage system or a domain therein can be conceptually represented as a matrix of memory controllers and equal size partitions of memory. In the specifically illustrated example, each row represents an indexed memory controller, and each column represents indexed memory partitions across multiple memory controllers. Mirrored pairs of data/meta-data members stored in the partitions are represented in the matrix by same-letter pairs, e.g., two A members, two B members, and so forth. The members of each pair are assigned to different memory controllers because otherwise both members of the pair would become inaccessible if their common memory controller became inaccessible. In the illustrated example there are 6 memory controllers and 15 mirrored pairs of members represented by the letters A-O. There are 3 pairs of memory controllers to which the mirrored pairs are sequentially assigned. More specifically, memory controllers 1 and 2 mirror each other, memory controllers 3 and 4 mirror each other, and memory controllers 5 and 6 mirror each other. Thus, the mirroring is RAID-1-like.

Referring to FIG. 3B, a drawback of memory controller mirroring is that when one of the memory controllers becomes unavailable, e.g., due to failure, maintenance, or replacement, the corresponding memory controller of the pair must support all the IO activities that would normally be distributed across the memory controller pair. For example, memory controller 2 must handle all IO activity to members A-E when memory controller 1 becomes inaccessible. The load imbalance caused by doubling the load on one memory controller and its managed drives tends to degrade performance of the storage system.

FIGS. 4A and 4B illustrate use of spare capacity with mirrored memory controllers. In the illustrated example there are 8 reserved spare partitions out of 36 total partitions, which corresponds to 22% overhead. The uneven amount of data and associated IO activities per memory controller causes imbalanced loading and divergent wear levels of persistent memory. If controller #2 fails, as specifically shown in FIG. 4B, the affected members A-E are copied from the mirror members on controller #1 to spare partitions with other controllers. The spare capacity of controller #1 cannot be used because it would result in both members of a pair being on the same memory controller. Consequently, there is undesirable load imbalance both during and after the recovery process.

FIGS. 5A and 5B illustrate balanced distribution of mirrored pairs. In a storage system or domain of N memory controllers, the per-controller memory space is subdivided into N-1 equal size partitions. Thus, there are N*(N-1) partitions in the representative matrix. The illustrated example has 6 memory controllers and 5 memory partitions per controller. One technique to achieve balanced distribution is to begin by assigning a 1st group of N-1 members of mirror pairs to the partitions in the 1st row, in order, from the 1st column to the last column. The number of members in the 1st group is equal to the number of memory partitions, i.e., N-1. In the illustrated example the 1st group includes 5 members A-E. The corresponding 5 members A-E of mirror pairs of the 1st group are assigned to the 1st column, in order, from the 2nd row to the 6th row. Members of a 2nd group of 4 mirror pairs F-I are assigned to partitions in the 2nd row, in order, from the 2nd column to the 5th column. The corresponding 4 members F-I of the 2nd group of mirror pairs are assigned to the 2nd column, in order, from the 3rd row to the 6th row. The assignment pattern alternating along rows and columns using available partitions is iterated until members have been assigned to all memory partitions. The resulting distribution is more evenly balanced than the mirrored memory controllers described above.

Another balanced distribution technique, which is specifically illustrated in FIG. 5B, is to form two triangular submatrices that are separated or border along either the main diagonal or antidiagonal of the representative matrix, wherein the partitions of the main diagonal or antidiagonal are part of one of the triangular submatrices. The members of each mirror pair are assigned to different ones of the triangular submatrices such that each triangular submatrix is the transpose of the other triangular submatrix (relative to the main diagonal or the antidiagonal depending on how the submatrices were formed). The resulting distribution is more evenly balanced than the mirrored memory controllers described above.

FIG. 6 illustrates parallelized access to members of the mirrored pairs when one of the memory controllers becomes inaccessible with balanced distribution. For example, when controller #3 becomes inaccessible, the corresponding mirror members of the affected mirror members B, F, J, K, L are evenly distributed across the 5 remaining memory controllers #1, #2, #4, #5, #6. Balanced distribution of the additional load mitigates or minimizes the performance impact of the failure of memory controller #3.

FIG. 7 illustrates balanced memory partition subsets with the mirror pairs of FIGS. 5A and 5B. Memory banks may be divided into multiple subsets that are allocated for specific purposes, e.g., allocated to a specific tenant in a multi-tenant storage system or allocated to a specific host application or type of host application or for system meta-data. The subsets are created and distributed to maximize parallel access. In the illustrated example, a global memory of 15 mirror pairs is organized as 3 subsets: {A, E, F, J, M, O}, {B, D, G, I, K, N}, and {C, H, L}. The smaller {C, H, L} subset comprises 3 mirror pairs (6 members) that are distributed across 6 memory controllers for maximum parallelism. The two larger subsets each comprises 6 mirror pairs (12 members) that are evenly distributed over 6 controllers, with 2 mirrors per controller.

FIGS. 8A and 8B illustrate distribution and use of spare capacity with the mirror pairs of FIGS. 5A and 5B. Spare capacity may be implemented to prevent a double memory controller failure from causing data unavailability or data loss. Spare capacity also provides additional data resiliency for persistent memory. The balanced distribution with spare capacity configuration includes N memory controllers and N memory partitions per controller. N=6 in the illustrated example. The mirror pair members are assigned in the manner already described above except that an extra partition per controller in the last column is reserved as spare capacity for rebuilding the mirrors when a controller fails. The overhead is only 1/N due to the balanced distribution of members. In the event that memory controller #3 fails, for example, all affected members B, F, J, K, L are accessible from the mirrors and rebuilt at the spare partitions with restored balance. All source and target locations of the mirrors are evenly distributed across all other controllers. Advantageously, the load is balanced during and after the rebuild, and all reserved spare partitions are effectively used.

Figure 9:
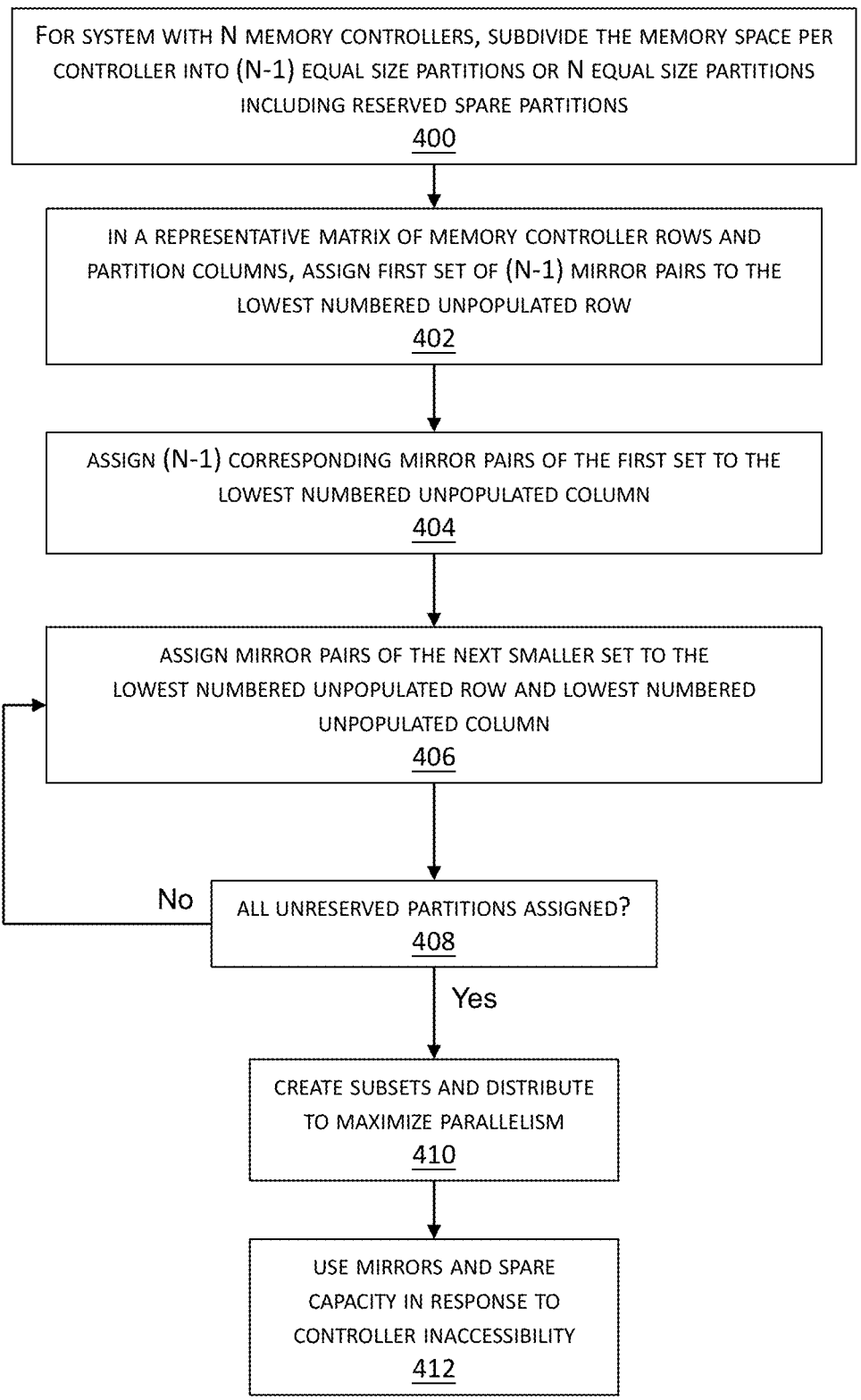
FIGS. 9 and 10 illustrate methods for balanced distribution of mirror pairs.

FIGS. 9 illustrates a method for balanced distribution of mirror pairs. As shown in step 400, for a system or domain having N memory controllers, the per-controller memory space is subdivided into either N-1 or N same-size partitions depending on whether spare capacity is being created. The per-controller memory space is subdivided into N-1 partitions if spare capacity is not being created. If spare capacity is being created, then the per-controller memory space is subdivided into N partitions with the highest indexed partition of each controller reserved as spare capacity. As indicated in step 402, in a representative matrix of indexed memory controller rows and indexed memory partition columns, a first set of N-1 mirror pairs is assigned to the lowest numbered unpopulated row (memory controller). Each set of mirror pairs is ordered and there are no duplicated pairs. As indicated in step 404, the corresponding N-1 mirror pairs of the first set are assigned to the lowest numbered unpopulated column (partition). Step 406 is assigning the mirror pairs of the next smaller set to the lowest numbered unpopulated row and the lowest numbered unpopulated column. In other words, the distribution described in steps 402 and 404 is repeated at the next available row and the next available column. The set size is decremented each time step 406 is iterated because the numbers of assigned partitions in each row and column decreases. Step 408 is determining whether all unreserved partitions have been assigned a member. The partitions that are reserved as spare capacity, if any, are not assigned members in the initial balanced distribution. If some unreserved partitions remain to be assigned, then step 406 is repeated for the next smaller set of members. If all unreserved partitions have been assigned, then subsets are optionally created and distributed for maximized parallelism in step 410. As indicated in step 412, the mirrors and spare capacity, if any, are used in response to memory controller inaccessibility.

Figure 10:
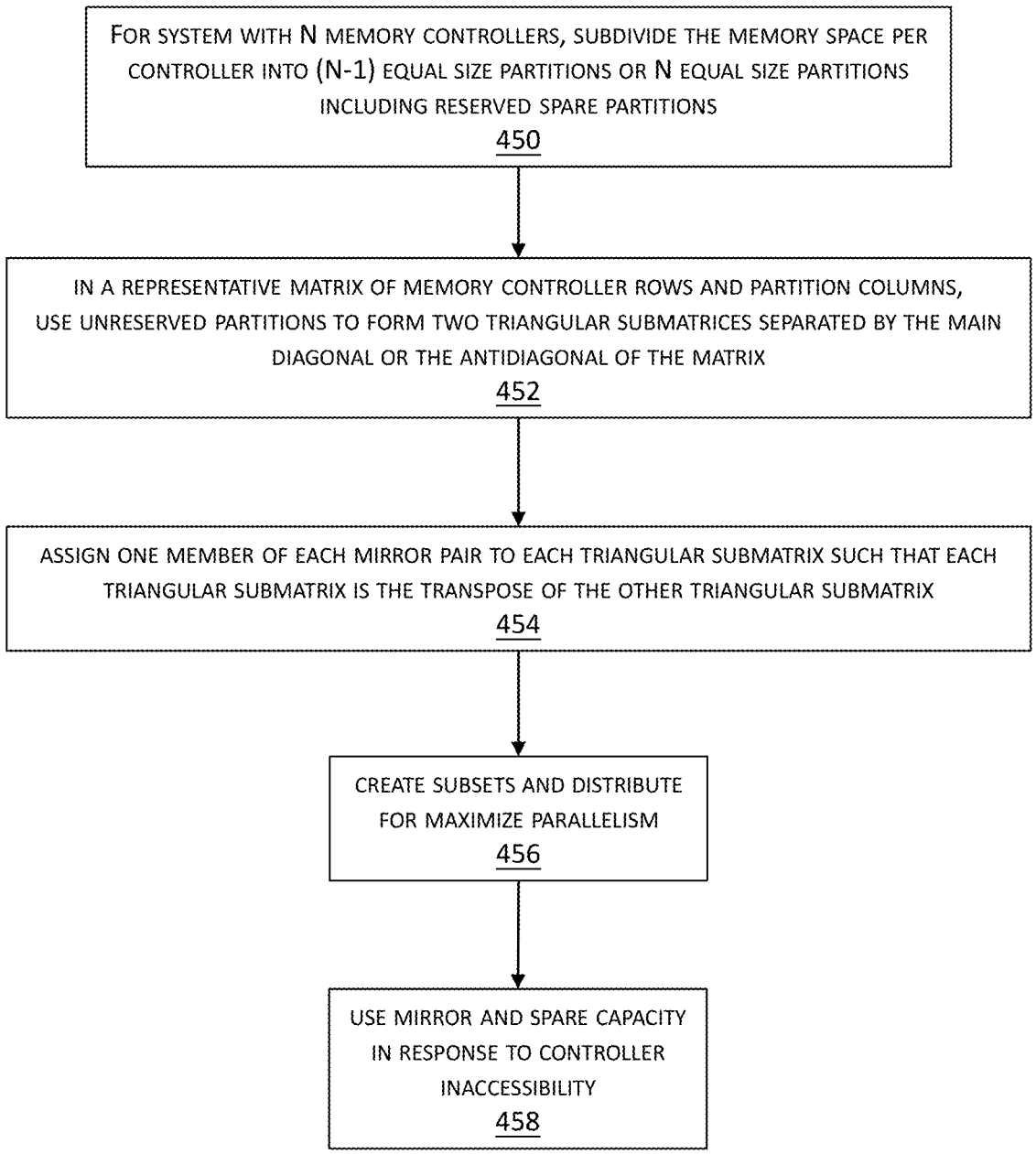

FIGS. 10 illustrates another method for balanced distribution of mirror pairs. As shown in step 450, for a system or domain having N memory controllers, the per-controller memory space is subdivided into either N-1 or N same-size partitions depending on whether spare capacity is being created. The per-controller memory space is subdivided into N-1 partitions if spare capacity is not being created. If spare capacity is being created, then the per-controller memory space is subdivided into N partitions with the highest indexed partition of each controller reserved as spare capacity. As indicated in step 452, in a representative matrix of memory controller rows and partition columns, the unreserved partitions are divided along the main diagonal or antidiagonal into two triangular submatrices. One member of each mirror pair is assigned to each triangular submatrix such that each triangular submatrix is the transpose of the other triangular submatrix as indicated in step 454. Subsets are optionally created and distributed for maximized parallelism in step 456. As indicated in step 458, the mirrors and spare capacity, if any, are used in response to memory controller inaccessibility.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising: a non-transitory storage system memory organized into a number of same-size partitions per memory controller of a plurality memory controllers, the partitions being assigned to members of minor pairs such that a first triangular submatrix of a representative matrix of the plurality memory controllers and the partitions is a transpose of a second triangular submatrix of the representative matrix.

2. The apparatus of claim 1 wherein there are N memory controllers and further comprising the number of same-size partitions per memory controller being equal to N and one partition on each memory controller being reserved as spare capacity.

3. The apparatus of claim 1 wherein there are N memory controllers and further comprising the number of same-size partitions per memory controller being N-1.

4. The apparatus of claim 1 further comprising the memory being main memory of a software-defined, server-based storage area network.

5. The apparatus of claim 1 further comprising the memory being memory banks of a disaggregated storage system.

6. The apparatus of claim 1 further comprising the memory partitions being divided into subsets with maximized parallelism.

7. A method comprising: organizing a storage system memory into a number of same-size partitions per memory controller of a plurality memory controllers; and assigning the partitions to members of mirror pairs such that a first triangular submatrix of a representative matrix of the plurality memory controllers and the partitions is a transpose of a second triangular submatrix of the representative matrix.

8. The method of claim 7 further comprising organizing the memory into N same-size partitions per memory controller for N memory controllers and reserving one partition on each memory controller as spare capacity.

9. The method of claim 7 further comprising organizing the memory into N-1 same-size partitions per memory controller for N memory controllers.

10. The method of claim 9 further comprising assigning a first set of N-1 mirror pairs to a lowest numbered unpopulated row of the representative matrix corresponding to one of the memory controllers.

11. The method of claim 10 further comprising assigning corresponding N-1 mirror pairs of the first set to a lowest numbered unpopulated column of the representative matrix corresponding to one of the partitions.

12. The method of claim 11 further comprising assigning mirror pairs of a next smaller set to a lowest numbered unpopulated row of the representative matrix and a lowest numbered unpopulated column of the representative matrix, iteratively, until all unreserved partitions have been assigned a member.

13. The method of claim 7 further comprising creating the first triangular submatrix and the second triangular submatrix along a main diagonal of the representative matrix.

14. The method of claim 7 further comprising creating the first triangular submatrix and the second triangular submatrix along an anti-diagonal of the representative matrix.

15. A non-transitory computer-readable storage medium storing instructions that when executed by a computer cause the computer to perform a method comprising: organizing a storage system memory into a number of same-size partitions per memory controller of a plurality of memory controllers; and assigning the partitions to members of mirror pairs such that a first triangular submatrix of a representative matrix of the plurality memory controllers and the partitions is a transpose of a second triangular submatrix of the representative matrix.

16. The non-transitory computer-readable storage medium of claim 15 in which the method further comprises organizing the memory into N same-size partitions per memory controller for N memory controllers and reserving one partition on each memory controller as spare capacity.

17. The non-transitory computer-readable storage medium of claim 15 in which the method further comprises organizing the memory into N-1 same-size partitions per memory controller for N memory controllers.

18. The non-transitory computer-readable storage medium of claim 15 in which the method further comprises assigning a first set of N-1 mirror pairs to a lowest numbered unpopulated row of the representative matrix corresponding to one of the memory controllers.

19. The non-transitory computer-readable storage medium of claim 18 in which the method further comprises assigning corresponding N-1 mirror pairs of the first set to a lowest numbered unpopulated column of the representative matrix corresponding to one of the partitions.

20. The non-transitory computer-readable storage medium of claim 19 in which the method further comprises assigning mirror pairs of a next smaller set to a lowest numbered unpopulated row of the representative matrix and a lowest numbered unpopulated column of the representative matrix, iteratively, until all unreserved partitions have been assigned a member.

\* \* \* \* \*